M. C. OVERMAN.
TIRE.
APPLICATION FILED APR. 18, 1914.

1,211,958.

Patented Jan. 9, 1917.
2 SHEETS—SHEET 1.

Attest:

Inventor:
Max Cyrus Overman
by  Atty.

M. C. OVERMAN.
TIRE.
APPLICATION FILED APR. 18, 1914.
1,211,958. Patented Jan. 9, 1917.
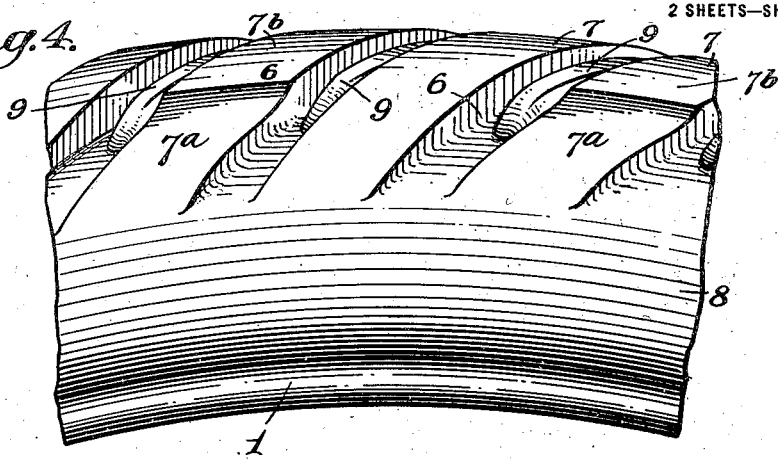
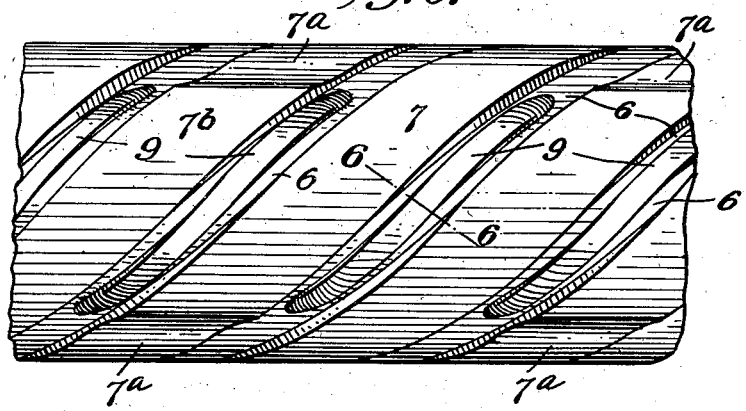
 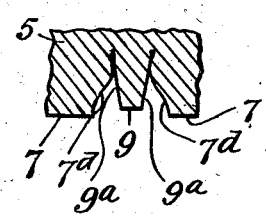

UNITED STATES PATENT OFFICE.

MAX CYRUS OVERMAN, OF NEW YORK, N. Y.

TIRE.

1,211,958.  Specification of Letters Patent.  Patented Jan. 9, 1917.

Application filed April 18, 1914. Serial No. 832,967.

*To all whom it may concern:*

Be it known that I, MAX CYRUS OVERMAN, a citizen of the United States, and a resident of New York, in the county and State of New York, have invented certain new and useful Improvements in Tires, of which the following is a specification.

My present invention relates to tires having special adaptation to pneumatic tires, and provides an extra deep tread or nose-portion to minimize the danger of puncture and for other reasons; and so disposes the rubber of said tread portion and otherwise so adapts the parts thereof that they are prevented from tearing off the tire and overworking the side-walls at any one place when in service.

Figure 1:
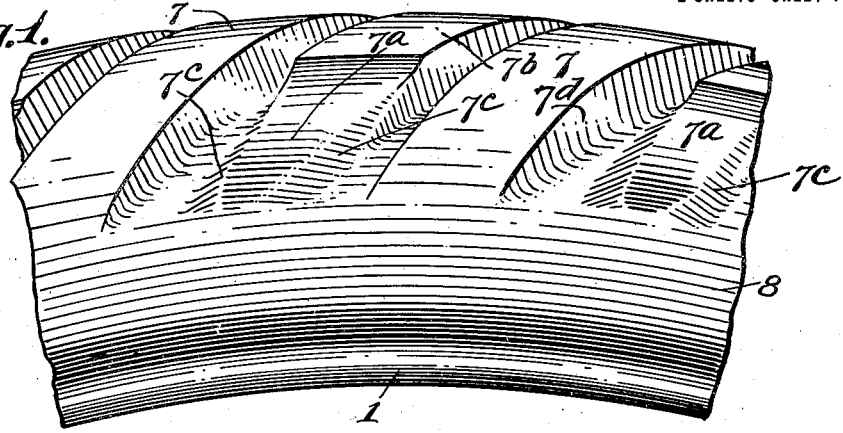
Figure 2:
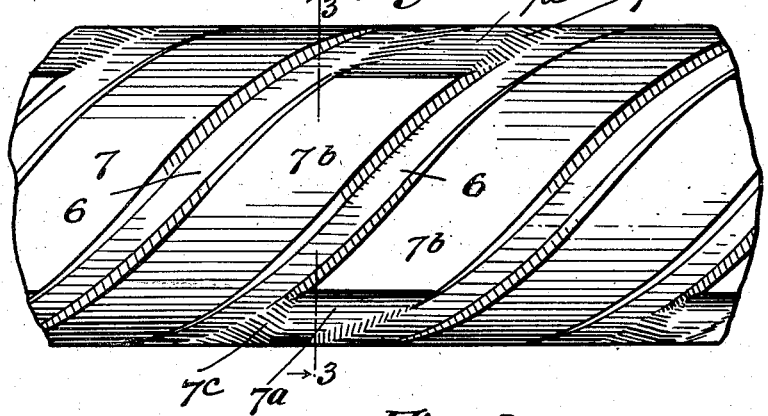
Figure 3:
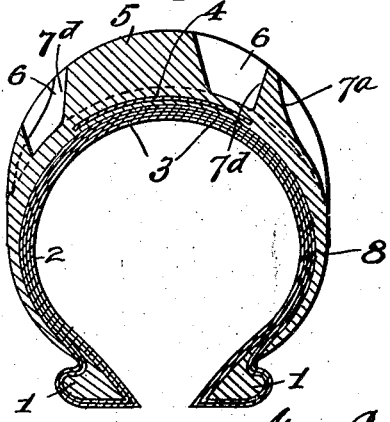
Figure 3:
Figure 3:
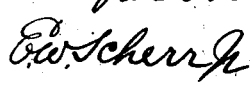

In the drawings, I have illustrated a pneumatic shoe within my invention, Figure 1 being a fragmentary side view thereof in perspective; Fig. 2 being a view looking at the tread as, for instance, looking at Fig. 1 from above; Fig. 3 being a cross-sectional view on the line 3—3 in Fig. 2 looking in the direction of the arrows; Figs. 4 and 5 are views corresponding respectively to Figs. 1 and 2 to illustrate a novel form of pebble ejector; and Fig. 6 is an enlarged sectional view on the line 6—6 in Fig. 5, and Fig. 7 is the same under load to illustrate a novel action of said pebble ejector.

I will now describe the tire of the drawings, reserving it to the claims to point out the novel features and to define the scope of the invention, it being understood that the claims will be given the due range of equivalents to which they may be entitled in view of the art.

The pneumatic shoe illustrated comprises the clencher beads 1, the canvas layers 2 of the carcass, the rubber zone 3 with its embedded canvas breaker strip 4, and the surrounding rubber tread-or nose-portion 5. It will be noted that I have made this tread portion 5 unusually deep for reasons and advantages including the following:—To guard the inner tube from puncture; also to give such easy riding quality to the tread portion that, without loss of easy riding quality, the tire can be used when pumped up to maximum air pressure and therefore run under the best condition for long life.

6—6 are transverse grooves extending into the tread portion for substantially its entire depth. Specifically and preferably, these grooves incline across the length of the tire and are helical or screw-like in form. These grooves provide between them relatively massive helical bars 7 whose solid, deep middle portions do the brunt of the work in supporting the load and in taking the wear, and whose end portions extend around to the sides of the tire where they reduce in depth and merge therewith. The outer surface $7^a$ of the ends of these bars does not curve continuously with the surface $7^b$ of their middle portion. On the contrary, the ends of the bars are rather abruptly cut away (preferably, as shown, on a concave curve) to a lower level where they leave said middle portion, and then continue, as shown, preferably on a convex curve until they merge with the convexity of the sides of the tire. I may in this fashion reduce the depth of both ends of each bar adjacent its middle portion, although in the drawings I have only attempted to show the idea applied to one end of each alternately. Further, the ends of these bars are beveled off at $7^c$ on their corners and sides, so as to merge said ends all the more successfully and gradually with the sides of the tire and the bottoms of the grooves 6—6. The walls $7^d$ of the grooves 6 converge inwardly toward each other and around into the bottoms of the grooves.

The object of the described construction of the tread portion is to prevent it from tearing off in spite of its great depth and mass. The spaces make the flexibilities right to prevent this, as do also the concavities at the ends of the middle portions of the bars and the devices for suitably merging the bars with the rest of the tire. The same improvements also prevent the extra heavy tread portion from causing the bending work to concentrate in the side-walls 8 of the tire, which it otherwise would do to the detriment of said sides, causing them to break and blow-out. On the contrary, my improvements so evenly distribute the bending work throughout the sides of the tire from tread to base that said walls are not injured after long use of the tire, in spite of its extra-heavy tread-portion.

Within each of the spaces 6 in Figs. 4 and 5 is shown a longitudinally extending wall or fin 9 projecting outwardly from the bottom of the space. These were not introduced into the previous figures to avoid obscuring their other features. These fins serve to prevent stones or other small articles from lodging in the spaces.

From the sectional view Fig. 6 taken on the line 6—6 in Fig. 5, it will be seen that the sides 9ª of the pebble ejector closely approach or may even unite at the bottom with the side walls 7ᵈ of the tread-bars 7. The object is that the base of the active bars in ground-contact and the ejector-fins shall be squeezed into contact when under load (compare the diagrammatic view Fig. 7) to form a unifying connection and mutual support for said bars and for the portions of the carcass between them. The result is that the carcass, being supported not only over the active bars but also over the spaces between them, is prevented from bulging down into said spaces and from being repeatedly bent and worked on itself to its injury as the wheel rotates. Further, the active bars temporarily unified by the fins 9 act collectively in flexing under the driving, skidding and other strains, instead of acting as merely spaced apart individuals, with the result that the tendency of the bars to be torn off the carcass or the carcass to be injured, is correspondingly reduced.

What I claim is:

1. A pneumatic shoe having a nose-portion which is generally rounded transversely and which comprises deep, spaced, transversely disposed rubber bars which are concaved to a reduced depth at the ends of their ground-contacting middle portion, and thence continue around to the sides of the tire.

2. A pneumatic shoe having a nose-portion which is generally rounded transversely and which comprises deep, spaced, transversely disposed rubber bars which are concaved to a reduced depth at the ends of their ground contacting middle portion, and thence continue around with reductions of depth into merger with the sides of the tire.

3. A pneumatic shoe having a nose-portion which is generally rounded transversely and which comprises deep, spaced, transversely disposed rubber bars which are concaved to a reduced depth at the ends of their ground-contacting middle portion, and thence become convex and continue with reductions of depth into merger with the sides of the tire.

4. A pneumatic shoe having a nose-portion which is generally rounded transversely and which comprises deep, spaced, transversely disposed rubber bars which are decidedly reduced in depth at the ends of their ground-contacting middle portion, and thence continue around to the sides of the tire.

5. A pneumatic shoe having a nose-portion which is generally rounded transversely and which comprises deep, spaced, transversely disposed rubber bars which are decidedly reduced in depth at the ends of their ground-contacting middle portion, and thence continue with reductions of depth into merger with the sides of the tire.

6. A pneumatic shoe having a nose-portion which is generally rounded transversely and which comprises deep, spaced, transversely disposed rubber bars which are decidedly reduced in cross section at the ends of their ground-contacting middle portion, and thence continue around to the sides of the tire.

7. A pneumatic shoe having a nose-portion which is generally rounded transversely and which comprises deep, spaced, transversely disposed rubber bars which are decidedly reduced in cross section at the ends of their ground-contacting middle portion, and thence continue with reductions of cross section into merger with the sides of the tire.

8. A pneumatic shoe comprising its carcass and a transversely generally-rounded, extra deep, protective rubber nose-portion on said carcass, said nose-portion having frequent transverse grooves therein substantially as deep as itself, the solid portions of the nose between said grooves being weakened by having portions removed from their outer surface at the ends of their middle ground-contacting portion.

9. A pneumatic shoe comprising its carcass and a transversely generally-rounded, extra deep, protective rubber nose-portion on said carcass, said nose-portion having frequent transverse grooves therein substantially as deep as itself, the solid portions of the nose between said grooves being weakened by having portions removed from their outer surface at the ends of their middle ground-contacting portion, said solid portions being substantially helically disposed on the carcass.

10. A rubber tire having a tread-portion with horizontally elongated spaces therein which open to the tread, and elongated wall-like fins in said spaces extending lengthwise thereof.

11. A rubber tire having a tread-portion with horizontally elongated spaces therein which open to the tread, and wall-like fins in said spaces extending lengthwise thereof, the side walls of said spaces and said fins squeezing into contact at the base when under load.

12. A tire having side-walls adjacent a central longitudinally extending opening and having a nose-portion secured to the lower ends of said side-walls, which is generally rounded transversely and which comprises deep, spaced, transversely disposed rubber bars which are decidedly reduced in depth at the ends of their ground-contacting middle portion and thence continue around to the sides of the tire.

13. A tire having side-walls adjacent a central longitudinally extending opening and having a nose-portion secured to the lower ends of said side-walls which is generally rounded transversely and which comprises deep, spaced, transversely disposed rubber bars which are decidedly reduced in depth at the ends of their ground-contacting middle portion and thence continue with reductions of depth into merger with the sides of the tire.

14. A pneumatic shoe comprising its carcass and a tread portion having deep tread grooves approaching the carcass, and members in such grooves which are gripped between the parts of the tread-portion that are in ground-contact and support the carcass at the grooves.

15. A rubber tire having a tread-portion with transversely extending, horizontally elongated, open-ended spaces therein, and wall-like fins in said spaces extending lengthwise thereof, the side walls of said spaces and said fins squeezing into contact at the base when under load.

In testimony whereof I affix my signature in presence of two witnesses.

MAX CYRUS OVERMAN.

Witnesses:
  E. W. SCHERR, Jr.,
  FRED E. LEE.